(12) United States Patent
Isles et al.

(10) Patent No.: US 10,758,967 B2
(45) Date of Patent: Sep. 1, 2020

(54) INVESTMENT CASTING PATTERN

(71) Applicants: ROLLS-ROYCE plc, London (GB); Rolls-Royce Deutschland Ltd & Co KG, Dahlewitz (DE)

(72) Inventors: David Stefan Isles, Sheffield (GB); Mareike Wiebalck, Laumühlen (DE); Peter Jesson, Berlin (DE); Mark Mullan, Bristol (GB); Christopher A Hall, Exminster (GB)

(73) Assignees: ROLLS-ROYCE plc, London (GB); ROLLS-ROYCE DEUTSCHLAND LTD & CO, Dahlewitz (DE)

( * ) Notice: Subject to any disclaimer, the term of this patent is extended or adjusted under 35 U.S.C. 154(b) by 0 days.

(21) Appl. No.: 16/437,560

(22) Filed: Jun. 11, 2019

(65) Prior Publication Data
US 2019/0388961 A1    Dec. 26, 2019

(30) Foreign Application Priority Data

Jun. 21, 2018  (GB) .................................. 1810212.9

(51) Int. Cl.
| B22C 7/02 | (2006.01) |
| B22C 9/04 | (2006.01) |
| B33Y 10/00 | (2015.01) |
| B33Y 80/00 | (2015.01) |

(52) U.S. Cl.
CPC ................. *B22C 7/02* (2013.01); *B22C 9/04* (2013.01); *B33Y 10/00* (2014.12); *B33Y 80/00* (2014.12)

(58) Field of Classification Search
CPC .... B22C 7/00; B22C 7/02; B22C 9/00; B22C 9/04
See application file for complete search history.

(56) References Cited

U.S. PATENT DOCUMENTS 4,160,313 A * 7/1979 Radford .................... B22C 7/02
164/249

FOREIGN PATENT DOCUMENTS

| GB | 1 496 806 A | 1/1978 |
| GB | 1 588 672 A | 4/1981 |
| WO | 01/24957 A1 | 4/2001 |

OTHER PUBLICATIONS

Nov. 29, 2018 Search Report issued in British Patent Application No. 1810212.9.

* cited by examiner

*Primary Examiner* — Kevin P Kerns
*Assistant Examiner* — Steven S Ha
(74) *Attorney, Agent, or Firm* — Oliff PLC (57) ABSTRACT

An investment casting pattern including: a consumable body formed of: a first body portion; and a second body portion; and a fastener arranged to form an interface between the first body portion and the second body portion, and to locate the first body portion relative to the second body portion, wherein the fastener is formed of a different material than the first body portion and the second body portion.

19 Claims, 6 Drawing Sheets

INVESTMENT CASTING PATTERN

FIELD OF THE DISCLOSURE

The present disclosure concerns an investment casting pattern, a method of investment casting a component and a fastener for locating and forming an interface between parts of a multi-part pattern.

BACKGROUND OF THE DISCLOSURE

In investment casting, a disposable or consumable pattern is formed in the shape of the component to be cast. The pattern is then coated in a ceramic, which sets to form a mould. The pattern is then removed from the mould, by melting or chemical leaching (dissolving) to leave a void in the mould, in the shape of the component to be cast. Molten metal is poured into the void, through the same opening that the pattern is removed through. The molten metal adopts the shape of the void, and hence the shape of the component to be formed. Once the metal is solidified, the mould is broken to remove the component.

When making complex components by investment casting, the pattern may be formed in several parts, which have to be joined together. Typically, with patterns made of wax, the joint between parts is formed by melting the mating faces of the surfaces together, and using a hot knife to form stitching lines.

BRIEF SUMMARY OF THE DISCLOSURE

According to a first aspect there is provided an investment casting pattern including: a consumable body formed of: a first body portion; and a second body portion; and a fastener arranged to form an interface between the first body portion and the second body portion, and to locate the first body portion relative to the second body portion, wherein the fastener is formed of a different material than the first body portion and the second body portion.

Misalignment of the body portions of the pattern can cause unwanted surface and structural defects in the component cast using the pattern. These defects can reduce the efficiency and/or life of the component, or can mean that the component is scrapped. The use of the fastener reduces the number of manual steps required to assemble the pattern, and provides a positive location feature for aligning the body portions relative to each other. Therefore, the fastener provides a simple, fast, strong and effective means for aligning and joining the parts of the pattern in a repeatable manner, independent of operator skill improving consistency and manufacturing efficiency over a large number of parts.

The first body portion and the second body portion may be formed of a first material having a first melting temperature. The fastener may be formed of a second material, having a second melting temperature greater than or approximately equal to the first melting temperature. Using a fastener with a melting point the same or higher than the body ensures the fastener is removed at the appropriate stage in the investment casting process.

The fastener may be formed of a polymer. The use of an appropriate polymer provides a fastener with the structural strength to hold the body portions together, whilst also enabling the fastener to be removed from the void in the mould. The first body portion and the second body portion may be formed of wax. A wax body is quick and inexpensive to make, and the wax can adopt complex geometries, with a high quality surface finish.

The first body portion may include a first mating surface and the second body portion may include a second mating surface. The first and second body portions may also include two or more mating surfaces. In the assembled body, the first and second mating surfaces may engage each other or the fastener. The investment casting pattern may include an adhesive material arranged to secure the first and second body portions to each other or the fastener.

The fastener may be formed by an additive layer manufacturing process.

The fastener may comprise a protruding member formed in and extending from the first body portion. The second body portion may include a recess arranged to receive the protruding member.

Alternatively, the fastener may comprise a chassis formed separately from the first body portion and the second body portion. The chassis may arranged to engage the first body portion and the second body portion. The chassis may include a first recess arranged to receive an end region of the first body portion. The first body portion may include a step at the end region, such that an outer surface of the first body portion is flush with an outer surface of the chassis, when the end region is received in the first recess. The chassis may include a second recess arranged to receive an end region of the second body portion.

The pattern may be of a nozzle guide vane or a blade in a gas turbine aerospace engine. The nozzle guide vane or blade may be a single crystal cast part.

According to a second aspect, there is provided a method of investment casting a component, the method including: providing a multi-part pattern, in the shape of the component to be cast, the multi-part pattern formed by: forming a first body portion, and a second body portion; and joining the first body portion and the second body portion using a fastener arranged to form an interface between the first body portion and the second body portion, and to locate the first body portion relative to the second body portion, wherein the fastener is formed of a different material than the first body portion and the second body portion; applying a coating on the multi-part pattern to form a mould; removing the pattern from the mould, to form a void within the mould; and casting the component in the void.

Misalignment of the body portions of the pattern can cause unwanted surface and structural defects in the component cast using the pattern. These defects can reduce the efficiency and/or life of the component, or can mean that the component is scrapped. The use of the fastener reduces the number of manual steps required to assemble the pattern, and provides a positive location feature for aligning the body portions relative to each other. Therefore, the fastener provides a simple, fast, strong and effective means for aligning and joining the parts of the pattern in a repeatable manner, independent of operator skill improving consistency and manufacturing efficiency over a large number of parts.

Removing the pattern from the mould, to form a void within the mould may include: chemically dissolving or melting the first body portion and the second body portion, and flushing the melted or dissolved material from the void.

Chemically dissolving or melting the first body portion and the second body portion may also chemically dissolve or melt the fastener. Alternatively, the method may include chemically dissolving or melting the fastener separately from chemically dissolving or melting the first body portion and the second body portion. Chemically dissolving or melting the fastener may also cure the coating.

Providing a multi-part pattern may include: forming the fastener by an additive layer manufacturing process.

Joining the first body portion and the second body portion using the fastener may include: applying a liquid adhesive to a surface of the first body portion arranged to engage the fastener and/or the second body portion; engaging the first body portion and the second body portion; and removing excess adhesive from an exterior surface of the assembled pattern.

The method may be a method of single crystal casting of a nozzle guide vane or blade for a gas turbine engine.

According to a third aspect there is provided an investment casting pattern including: a consumable body formed of: a first body portion; and a second body portion; and a fastener arranged to form an interface between the first body portion and the second body portion, and to locate the first body portion relative to the second body portion, wherein the fastener comprises a chassis formed separately from the first body portion and the second body portion, wherein the chassis is arranged to engage the first body portion and the second body portion, and wherein the chassis includes a first recess arranged to receive an end region of the first body portion.

According to a fourth aspect, there is also provided a fastener arranged to form an interface between a first body portion and a second body portion of an investment casting pattern, and arranged to locate the first body portion relative to the second body portion, the fastener formed of a different material to the first body portion and the second body portion.

Misalignment of the body portions of the pattern can cause unwanted surface and structural defects in the component cast using the pattern. These defects can reduce the efficiency and/or life of the component, or can mean that the component is scrapped. The use of the fastener reduces the number of manual steps required to assemble the pattern, and provides a positive location feature for aligning the body portions relative to each other. Therefore, the fastener provides a simple, fast, strong and effective means for aligning and joining the parts of the pattern in a repeatable manner, independent of operator skill improving consistency and manufacturing efficiency over a large number of parts.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
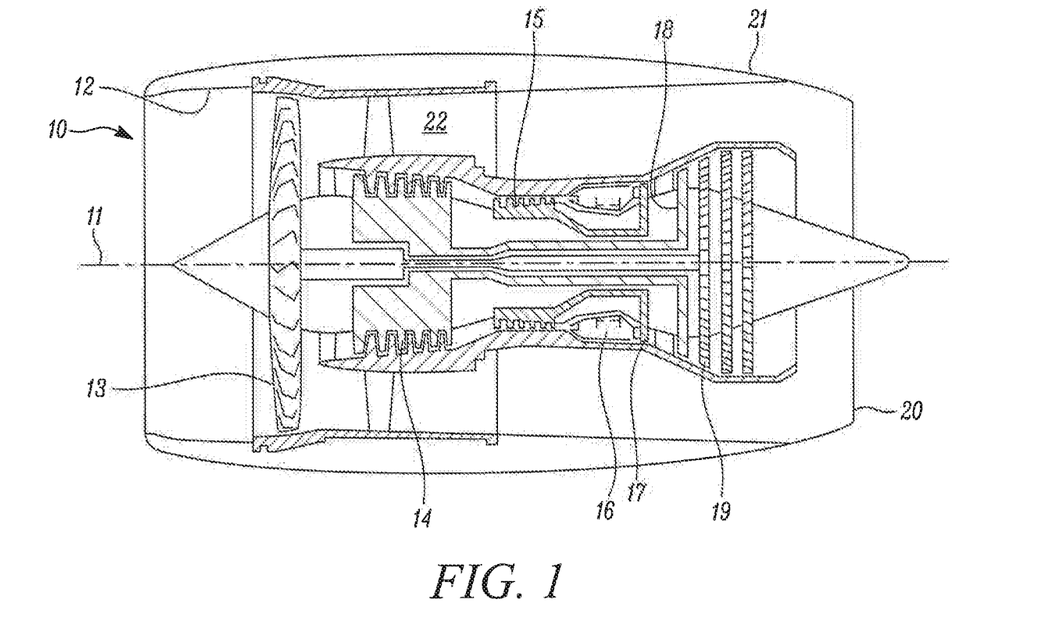
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2A:
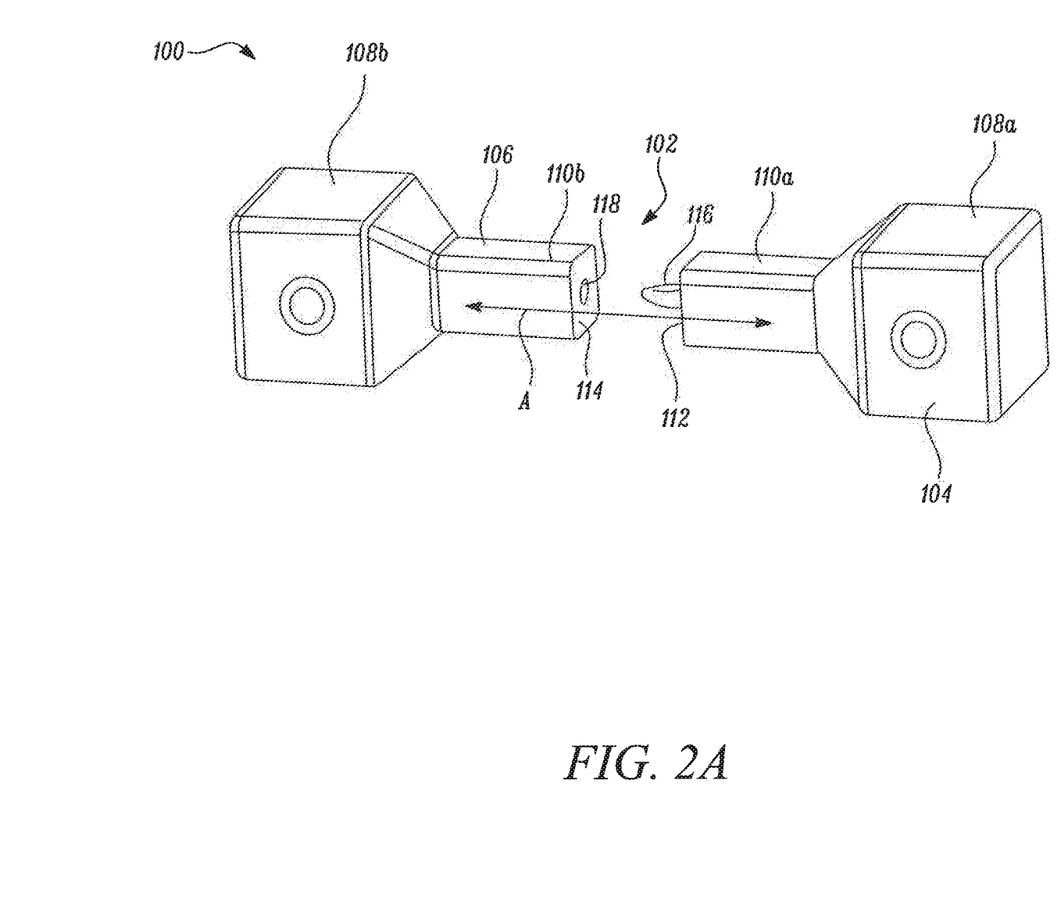
FIG. 2A is a schematic perspective view of a multi-part pattern according to a first embodiment.

Within a gas turbine engine 10, such as discussed above, a number of components are formed by investment casting, using wax patterns. For large or complex components, the pattern may be formed of several separate parts, that have to be joined before the casting process. FIG. 2A illustrates an exploded view of a schematic example of a multi-part pattern 100.

In the example shown in FIG. 2A, the pattern 100 has a body 102 formed of a first body portion 104 and a second body portion 106. Each body portion 104, 106 includes an enlarged end region 108a,b and a neck region 110a,b extending from the end region 108a,b. the neck regions 110a,b extend parallel to each other along a direction A. The body portions 104, 106 join in the neck regions, 110a,b, in the direction A, so the assembled body 102 is dumbbell shaped.

The ends of the neck regions 110a,b of the first body portion 104 and second body portion 106 form respective mating surfaces 112, 114. The mating surfaces 112, 114 face each other, such that when the body portions 104, 106 are assembled to form the body 102, the mating surfaces 112, 114 contact each other to form an interface.

A guiding projection 116 protrudes out of the mating surface 112 of the first body portion 104. A corresponding recess 118 is formed in the mating surface 114 of the second body portion 106. When the body 102 of the pattern 100 is assembled, the guide projection 116 is fully received in the recess 118. Thus the guiding projection 116 and recess 118 help to ensure that the first and second body portions 104, 106 are properly aligned with respect to each other, and are not offset perpendicular to the direction A.

Figure 2B:
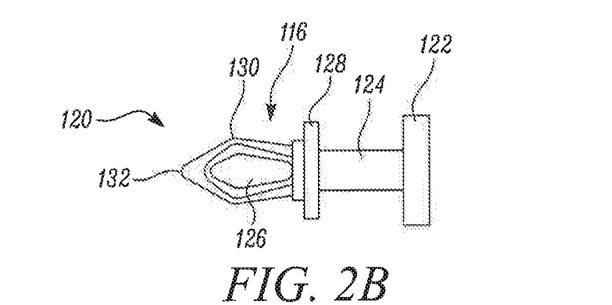
FIG. 2B is a schematic side view of the fastener form the pattern of FIG. 2A.

The guiding projection 116 is formed by a rivet 120, formed within the first body portion 104. FIG. 2B illustrates the rivet 120 in more detail. The rivet 120 includes a circular base 122 at one end. A shaft 124 extends from the circular base 122, and a head 126 is formed at the opposite end of the shaft 124 to the base 122. The head 126 widens from the shaft 124, to a waist 130, and then tapers to a tip 132. An annular collar 128 extends around the end of the shaft 124, where the head 126 meets the shaft 124.

In the first body portion 104, the rivet 120 is fitted such that the base 122 and shaft 124 sit within the body portion 104, with the collar 128 flush with the mating surface 112 of the body portion 104. The head portion 126 thus forms the protruding guide projection 116.

The recess 118 in the second body portion 106 is formed to be a tight fit with the head portion 126, such that at least some mechanical strength is provided to the joint between the portions 104, 106. In particular, the waist 130 of the heat portion 126 may be a tight fit in the recess 118, such that if joined together, the first and second body portions 104, 106 are held in place, but can be rotated or pulled apart on application of sufficient force.

Typically, the body portions 104, 106 are formed using a mould, with the wax poured or injected into the mould. The rivet 120 is formed before the first body portion 104, and then placed into the mould either before, or whilst the wax is introduced (or just after the wax is introduced, whilst it is still soft). The first body portion 104 is thus formed around the rivet 120. The recess 118 is provided in the mould for the second body portion 106, and so the second body portion 106 is formed with the recess 118 in it.

Whilst the first and second body portion 104, 106 are wax, the rivet 120 is formed of a different material, such as a polymer.

The wax used in the body portions 104, 106 is relatively inexpensive, and is also relatively quick to use when forming the body portions 104, 106. The wax also provides a smooth surface finish on the pattern 100 (which in turn results in a smooth surface finish on the cast component), and can form complex and small shapes. On the other hand, the polymer used for the rivet 120 can provide stiffness and mechanical strength to the joint between the body portions 104, 106.

As will be discussed in more detail below, the material of the rivet 120 should also melt at suitable temperatures in for the investment casting process. In some examples, the rivet 120 may melt at the same temperature as the wax, or at a higher temperature, but this is not necessarily the case, and the rivet may melt at a lower temperature. The rivet should also have sufficient mechanical strength and rigidity to form the joint, and also not leave any contamination in the mould.

FIGS. 4A to 4D illustrate a method 30 of casting a component using a multi-part pattern 100 as discussed above.

Figure 4A:
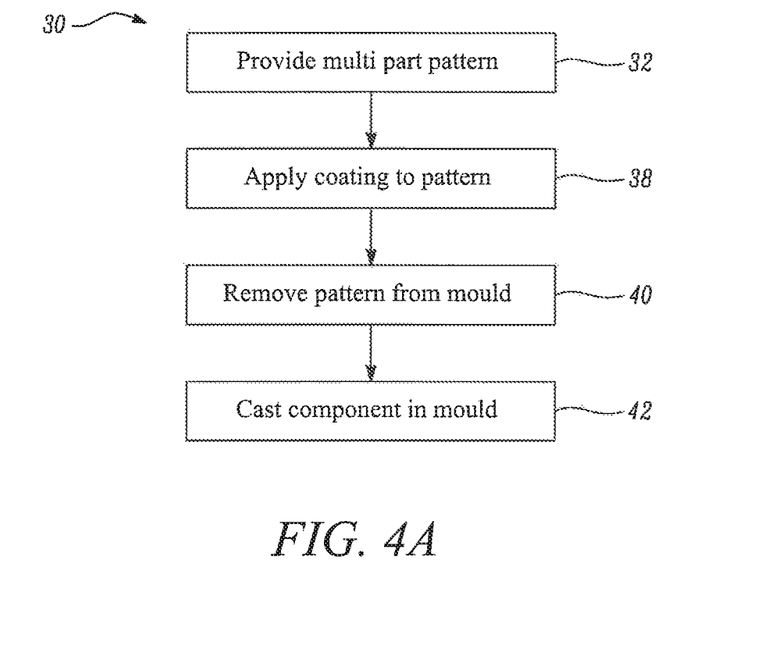
FIG. 4A illustrates a method of casting a component.

At a first step 32, the pattern 100 is provided. The pattern 100 is formed in the shape of the component that is to be cast.

At a second step 38, the pattern 100 is coated to form a mould. For example, the pattern 100 may be coated in a liquid ceramic, which adopts the shape of the pattern 100. The coating is then allowed to harden, and may optionally undergo further treatment to prepare the mould.

At a third step 40, the pattern 100 is removed from the mould. The mould is formed with one or more openings in it, through which the pattern 100 is exposed. The openings may be formed by the pattern 100 itself, by a support structure used to hold the pattern 100 during coating, or by some other barrier or object. As will be discussed in more detail below, the pattern 100 is removed from the mould through the opening(s).

Removing the pattern 100 forms a void in the middle of the mould. The void is formed in the shape of the pattern, and hence in the shape of the component to be cast.

At a final step 42, the component is cast by pouring molten material (for example metal) into the void, though the openings. Once the component is set, it may be removed from the mould by breaking the mould around the component.

Figure 4B:
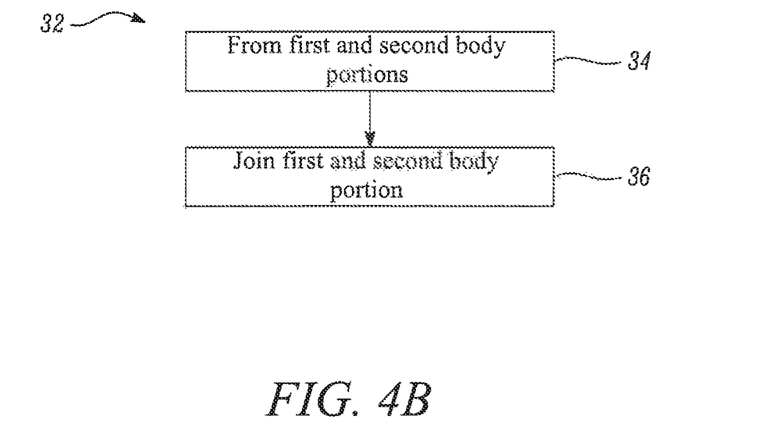
FIG. 4B illustrates the step of providing a multi part pattern, from the method of FIG. 4A, in more detail.

FIG. 4B illustrates the step of 32 providing the multi-part pattern 100, in more detail. As discussed above, the pattern is a multi-part pattern 100, including several different portions than need to be joined together to form the complete body 102. In a first sub-step 34, the first and second body portions 104, 106 are formed, for example by injection moulding or another casting or moulding processes. As discussed above, the first body portion 104 is formed with the rivet 120 integrated into it.

Figure 4C:
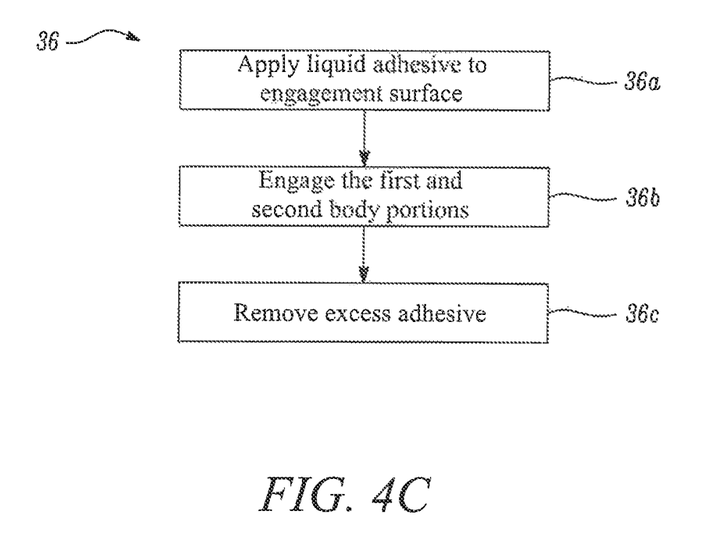
FIG. 4C illustrates the step of joining the first and second body portions, from the method of FIG. 4B, in more detail.

In a second sub-step 36, the first and second body portions 104, 106 are joined together. FIG. 4C illustrates the steps involved in joining the body portions 104, 106.

As shown in FIG. 4C, prior to joining, a hot sticky liquid wax is applied 36a to the mating (or engagement) surfaces 112, 114 of the body portions 104, 106. The first and second body portions 104, 106 are then engaged 36b, using the guide projection 116 and recess 118 to ensure the correct alignment between the portions, without any offset in the plane perpendicular to the direction A. The body portions 104, 106 are brought together and then in a final step 36c, any of the hot wax that has seeped out of the join is cleared to leave a clean interface.

Figure 4D:
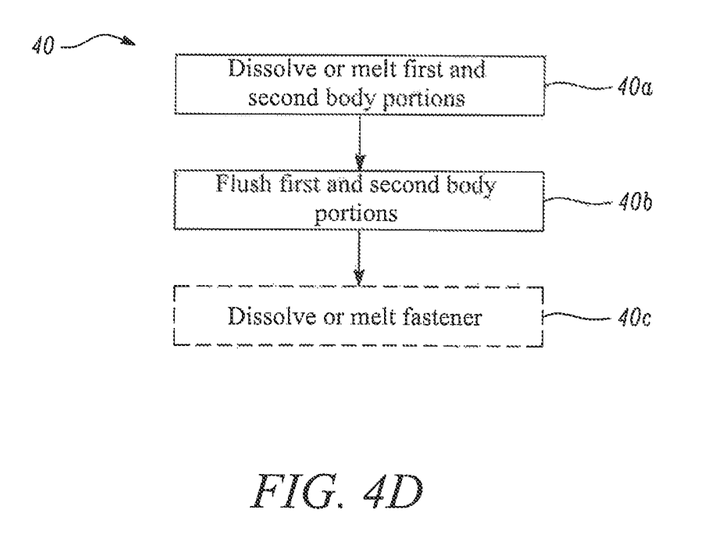
FIG. 4D illustrates the step of removing the pattern from the mould, from the method of FIG. 4A, in more detail.

There are a number of different ways that the pattern 100 may be removed from the mould. As shown in FIG. 4D, the wax is first dissolved or melted 40a, and then flushed 40b through the openings in the mould. For example, the wax pattern 100 may be heated, in order to melt the wax, or a leaching chemical may be provided to dissolve the wax.

In one embodiment, the rivet 120 is formed of a material that melts at approximately the same temperature as the wax of the pattern 100. Therefore, as the wax pattern 100 is melted, the rivet 120 is also melted, and flushed through the openings.

The rivet 120 may melt at a lower temperature than the wax, however, the melting temperature of the rivet should be higher than any temperature encountered during, for example, the coating of the pattern 100. The rivet 120 may also melt at a higher temperature than the wax melts, but a temperature which is still reached in the step of removing the pattern 100.

Alternatively, where a leaching chemical is used, the rivet may be made of a material that is dissolved by the same chemical.

In other examples, as shown in FIG. 4D, a separate step of removing the rivet 120 may be required. This may be the case where the rivet 120 is formed of a material that does not melt at the temperatures reached during removal of the pattern, or of a material that does not dissolve in the same leaching chemical. As before, in this case, the rivet may be removed by heating to an appropriate temperature, or use of an appropriate chemical.

In some cases, the mould may undergo further treatment, for example an outburn to remove any residual wax, or harden the coating, or a chemical clean. Where the rivet 120 is not removed with the pattern 100, it may be removed as part of this treatment.

In further examples, the rivet may be small enough to escape the opening through which the melted or dissolved wax passes.

The rivet 120 discussed above is given by way of example only. Any suitable structure may be used to provide the guiding projection(s) 116.

Figure 2C:
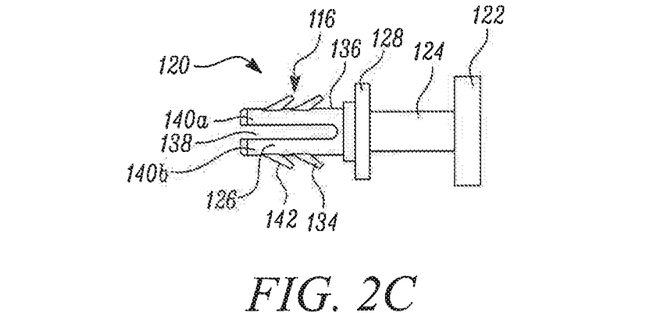
FIG. 2C is schematic side view of an alternative fastener for use in the pattern of FIG. 2A.

FIG. 2C shows an alternative example of a rivet 120 for use in the pattern 100 of FIG. 2A. In this example, the base 122, shaft 124 and collar 128 are the same as shown in FIG. 2B. However, in the example shown in FIG. 2C, the head 126 is substantially cylindrical in shape.

The cylindrical head 126 extends along a longitudinal axis along direction A, and has a sidewall 136 extending around the direction A. The head 126 includes a number of projections 134 extending form the sidewall 136. The projections 134 have an inclined surface 142 that forms an acute angle with the sidewall 136 of the head 126, when measured from the direction of the base 122 of the rivet 120. As such, when the head 126 is in the recess 118, the projections resist movement to draw the head 126 out of the recess, because the inclined surface engages with the recess 118. However, the inclined surface also allows the head 126 to be pushed into the recess 118 during assembly of the body 102.

The head 126 also includes a slot 138 extending along the axis. This splits the head into fingers 140*a,b*, and allows for the fingers 104*a,b* to move together to allow the head to be initially inserted into the recess 118.

In the example shown in FIG. 2A, the guiding projection 116 is axisymmetric around the direction A. However, it may also be shaped to provide rotational alignment between the body portions 104, 106. In this case, the projection 116 and recess 118 may be shaped such that the projection 116 can only be received in the recess 118 when they are rotationally aligned. For example, the projection 116 may include bulges at one or more positions around its circumference, and the recess 118 may have corresponding bulges.

In the example shown, a single guiding projection 116 is used to locate the first and second body portions by aligning them along the direction A (translational alignment), and to form an interface between the first and second body portions 104, 106. However, it will be appreciated that multiple such projections may be used. This helps secure rotational alignment, around the direction A, as well as translation alignment. In some cases, multiple projections may extend form the same base 122, or separate rivets may be provided. In some examples, one or more projections may extend from each mating surface 112, 114, and may be received in recesses 118 in the opposite surface 112, 114.

Furthermore, in the example discussed above, the rivet 120 is provided in the first body portion 104, as it is formed. However, in other examples, the body portion 104 may be formed and the rivet 120 fitted later. In this example, the first body portion 104 may be formed with a recess to receive the rivet 120 or the recess may be cut after formation. Similarly, the recess 118 in the second body portion 106 may be formed as the body portion 106 is formed, or may be cut after formation.

Figure 3A:
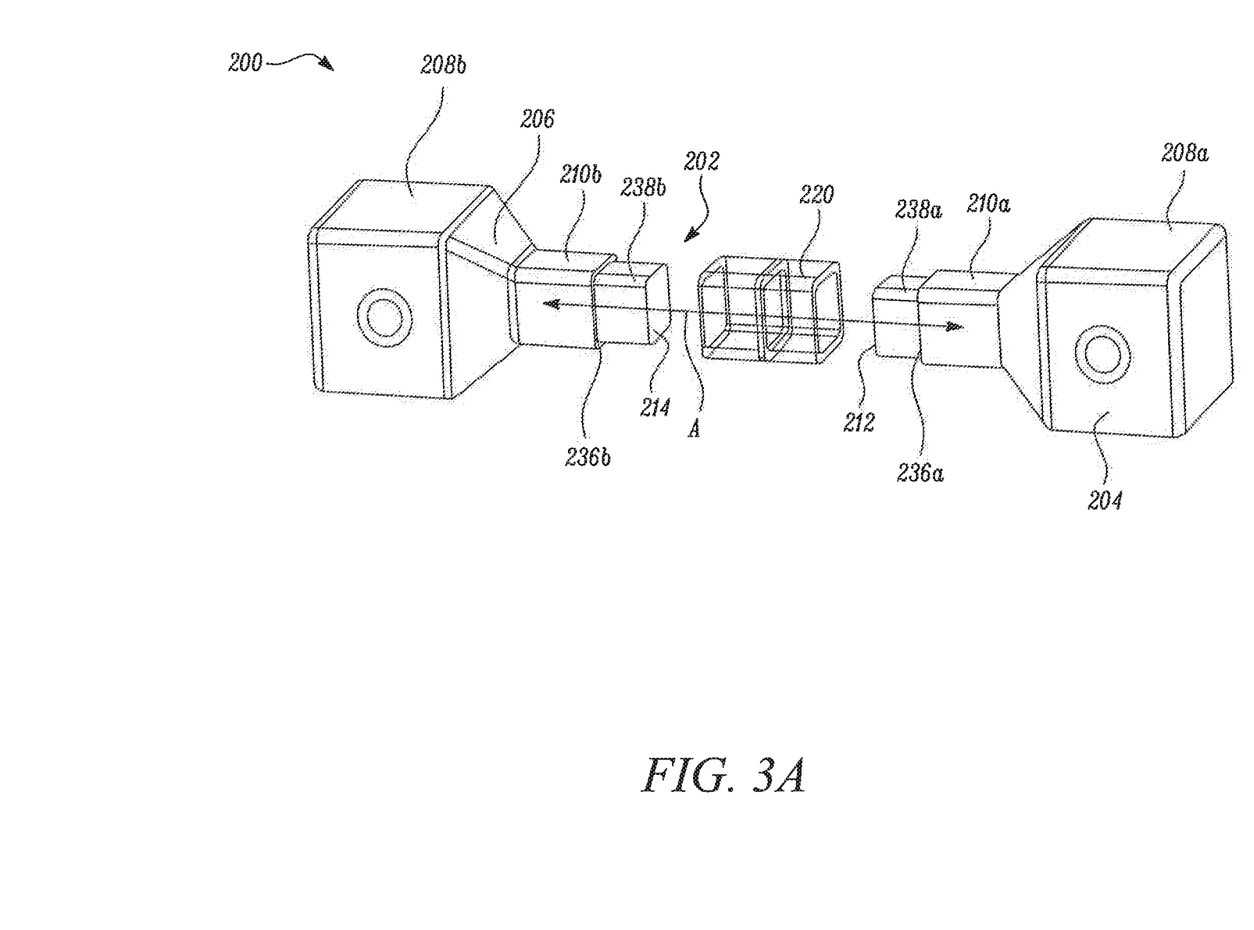
FIG. 3A is a schematic perspective view of a multi-part pattern according to a second embodiment.

FIG. 3A illustrates an alternative embodiment of a two part pattern 200. As with the embodiment shown in FIGS. 2A and 2B, the pattern 200 is formed of a body 202 having a first body portion 204 and a second body portion 206. Further similar to the embodiment shown in FIGS. 2A, and 2B, each body portion 204, 206 includes an enlarged end 208*a,b* and a neck 210*a, b*, and each body portion 204, 206 is formed with a respective mating surface 212, 214 at the end of the neck 210*a,b* which form an interface between the portions 204, 206, when the body portions 204, 206 are brought together in the direction A.

Figure 3B:
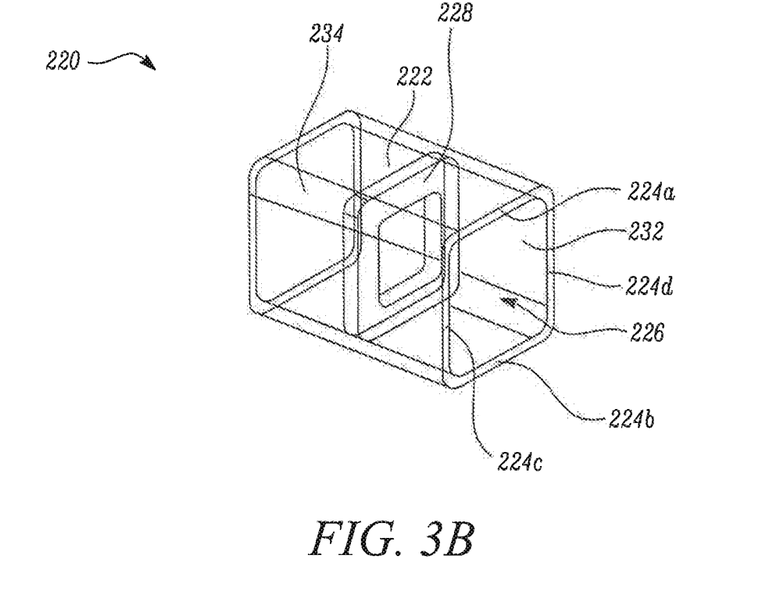
FIG. 3B is a schematic perspective view of the fastener form the pattern of FIG. 3A.

In the embodiment shown in FIG. 3A, a chassis 220 is provided to locate the body portions 204, 206 relative to each other, and to form an interface between the body portions 204, 206. FIG. 3B shows the chassis 220 in more detail.

The chassis 220 is formed of a sleeve 222. The sleeve 222 has a first sidewall 224*a* extending along direction A. A second sidewall 224*b* extends parallel to and spaced form the first sidewall 224*a*. A third sidewall 224*c* also extends along the direction A, and extends from a first edge of the first sidewall 224*a* to a first edge of the second sidewall 224*b*, such that the third sidewall 224*c* is perpendicular to the first and second sidewalls 224*a,b*. Similarly, a fourth sidewall 224*d* is formed, extending along the direction A, and from a second edge of the first sidewall 224*a*, opposite the first edge to a first edge of the second sidewall 224*b*, opposite the first edge, such that the fourth sidewall 224*d* is also perpendicular to the first and second sidewalls 224*a,b*. Therefore, the sidewalls 224*a-d* define a passage 226 extending through the sleeve 222, along direction A, with square cross-section perpendicular to direction A.

Midway along the passage 226, a dividing wall 228 is provided, perpendicular to direction A. The dividing wall 228 has a central opening 230, such that the passage 226 is narrowed on all edges, but not shut. The dividing wall 228 defines a first recess 232 formed at a first end of the sleeve 222, and a second recess 234 formed at the opposite end.

In the assembled body 202, an end of each neck portions 210*a,b* is received in a respective recess 232, 234 in the sleeve 222. The dividing wall 228 acts as a stop to ensure that each neck 210*a,b* is pushed the correct distance into the sleeve 222. Therefore, the chassis 220 acts to locate the body portions 204, 206, relative to each other along the direction A, and around the direction A. The chassis 220 also forms an interface between the body portions 204, 206 at the dividing wall 228.

As best shown in FIG. 3A, a step 236*a,b* is formed in the neck 210*a,b*, near the mating surfaces 212, 214. The step 236*a,b* extends around the neck 210*a,b* and causes a narrowing of the neck 210*a,b* at the end regions 238*a,b*. The step is positioned such that when the body portions 204, 206 is fitted into the recess 232 234 on the sleeve 222, and the mating surface 212, 214 abuts the dividing wall 228, the step abuts the end of the sleeve 222. The depth of the step is defined such that the narrower end regions 238*a,b* form a tight fit inside the recesses 232, 234, and the outer surface of the neck 210*a,b* is flush with the outer surface of the chassis 220.

The chassis 220 can be formed of the same materials as the rivet 120 of the first embodiment.

The method 30 of casting a component using the chassis of FIG. 3A is the same as the method shown in FIGS. 4A to 4D and as discussed above with reference to FIGS. 2A and 2B. When using the chassis 220, the mating surfaces 212, 214 are coating with the sticky wax. The dividing wall 228, sides of the recesses 232, 234 and sides of the end regions 238*a,b* up to the step 236*a,b* may be coated instead or as well as the mating surfaces 212, 214.

When the body portions 204, 206 are pushed into the sleeve 222, an interface is formed by hot wax joining the mating surfaces 212, 214 though the opening 230 in the dividing wall. Any excess hot wax escapes through the ends of the sleeve 22. This can be wiped off to form a smooth finish on the pattern 200.

Figure 3C:
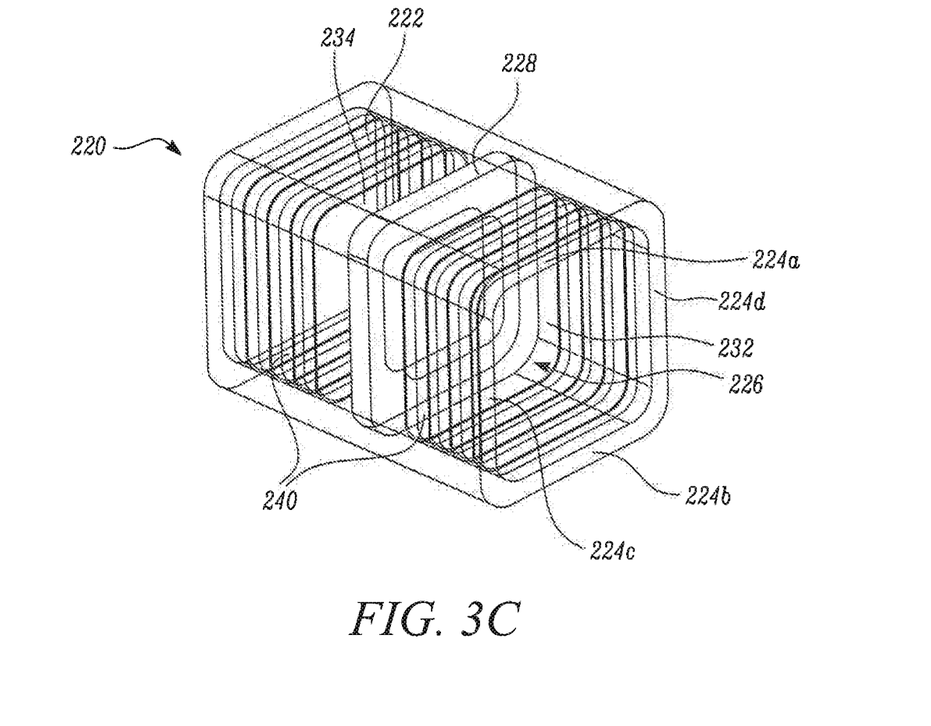
FIG. 3C is schematic perspective view of an alternative fastener for use in the pattern of FIG. 3A.

FIG. 3C shows an alternative example of the chassis 220. In this example, a number of ribs 240 are formed on the inner surface of the sleeve 222. This act to prevent withdrawal of the body portions 204, 206 after that have been inserted.

In yet a further alternative example, the chassis 220 may include a recess arranged to receive one of the body portions 204, 206, and the chassis 220 may include a guiding projection (not shown) extending in the opposite direction to the recess. The guiding projection may be received in recess formed in the other body portion 204, 206, in a similar manner as discussed in relation to FIG. 2A.

In a further example, the chassis 220 may not include a sleeve. Instead two guiding projections may extend form a central plate, with each guiding projection received in a corresponding recess in different body portions 204, 206. The mating surfaces 212, 214 form an interface at the central plate.

In yet further examples, projections may be provided in the recesses 232, 234, arranged to engage with openings in the body portions 204, 206, or the recesses may include openings arranged to receive additional projections formed on the body portions 204, 206. In some examples, projections formed on a one of the body portions 204, 206, may pass through the dividing wall 228, into corresponding recesses formed in the other body portion 204, 206.

In the above embodiments, a rivet 120 or chassis 220 are provided to align the first and second body portions 104, 204, 106, 206 relative to each other, and to form an interface between the first and second body portions 104, 204, 106, 206. These are just examples of mechanical fasteners that can be used to provide the alignment and interface. Any suitable fastener 120, 220 may be used.

As discussed above, the fastener 120, 220 is formed of a different material to the body 102, 202. The fastener 120, 220 may be formed of any suitable material, having the desired stiffness, strength and melting properties, as discussed above. By way of example, the fastener may be a thermosetting polymer, such as an epoxy-resin. For example, the fastener 120, 220 may be DMS Somos® 8120, although other epoxy resins or other thermosetting polymers may be used.

Both the body 102, 202 and fastener 120, 220 must be capable of removal from the mould, during the casting process, so that the void can be formed.

The pattern 100, 200 should be formed of a material that is relatively inexpensive, relatively quick to use when forming the body portions 104, 204, 106, 206, that provides a smooth surface finish on the pattern 100, 200 (which in turn results in a smooth surface finish on the cast component), and that can form complex and small shapes. On the other hand, the polymer used for the rivet 120 or chassis 220 should provide stiffness and mechanical strength to the joint between the body portions 104, 204, 106, 206. In at least some examples, the fastener 120, 220 can be made by additive layer manufacturing.

The patterns 100, 200 discussed above can be used to form any component of a gas turbine engine 10, that is manufactured using the investment casting process (also referred to as lost wax casting).

In one example, the pattern may be used to form a nozzle guide vane. However, other parts may also be formed using the patterns discussed above. The parts may be formed by a single crystal casting process. Since the use of the patterns minimised defects where the parts of the pattern 100, 200 are joined, less defects form in single crystal cast parts.

The patterns 100, 200 may also be used to cast any other shape, and is not just limited to gas turbine parts.

The fasteners 100, 200 discussed above can be used to join parts of any multi-part pattern for use in investment casting. The pattern may have any number of parts, and may be formed of any suitable material that can be removed during the casting process. Furthermore, where two body parts are joined, this may be at a single mating surface, as discussed above, or by two or more mating surfaces that contact and join together.

Although in the above, hot wax is used as an adhesive to hold the parts of the pattern together, any suitable adhesive may also be used.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. An investment casting pattern including:
   a consumable body formed of: a first body portion; and a second body portion; and
   a fastener arranged to form an interface between the first body portion and the second body portion, and to locate the first body portion relative to the second body portion, wherein the fastener is formed of a different material than the first body portion and the second body portion, and
   wherein the fastener comprises a chassis formed separately from the first body portion and the second body portion, wherein the chassis is arranged to engage the first body portion and the second body portion.

2. The investment casting pattern of claim 1, wherein the first body portion and the second body portion are formed of a first material having a first melting temperature, and wherein the fastener is formed of a second material, having a second melting temperature greater than or approximately equal to the first melting temperature.

3. The investment casting pattern of claim 1, wherein the fastener is formed of a polymer.

4. The investment casting pattern of claim 1, wherein the first body portion includes a first mating surface and the second body portion includes a second mating surface; wherein, in an assembled body, the first and second mating surfaces engage each other or the fastener; and wherein the investment casting pattern includes an adhesive material arranged to secure the first and second body portions to each other or the fastener.

5. The investment casting pattern of claim 1, wherein the fastener is formed by an additive layer manufacturing process.

6. The investment casting pattern of claim 1, wherein the fastener comprises a protruding member formed in and extending from the first body portion; and wherein the second body portion includes a recess arranged to receive the protruding member.

7. The investment casting pattern of claim 1, wherein the chassis includes a first recess arranged to receive an end region of the first body portion.

8. The investment casting pattern of claim 7, wherein the first body portion includes a step at the end region, such that an outer surface of the first body portion is flush with an outer surface of the chassis, when the end region is received in the first recess.

9. The investment casting pattern of claim 8, wherein the chassis includes a second recess arranged to receive an end region of the second body portion.

10. The investment casting pattern of claim 1, wherein the pattern is of a nozzle guide vane or blade in a gas turbine aerospace engine.

11. A method of investment casting a component, the method including:
    providing a multi-part pattern, in the shape of the component to be cast, the multi-part pattern formed by:
        forming a first body portion, and a second body portion; and joining the first body portion and the second body portion using a fastener arranged to form an interface between the first body portion and the second body portion, and to locate the first body portion relative to the second body portion, wherein the fastener is formed of a different material than the first body portion and the second body portion;
    applying a coating on the multi-part pattern to form a mould;
    removing the pattern from the mould, to form a void within the mould;
    casting the component in the void, and
    wherein the fastener comprises a chassis formed separately from the first body portion and the second body portion, wherein the chassis is arranged to engage the first body portion and the second body portion.

12. The method of claim 11, wherein removing the pattern from the mould, to form a void within the mould includes: chemically dissolving or melting the first body portion and the second body portion, and flushing the melted or dissolved material from the void.

13. The method of claim 12, wherein chemically dissolving or melting the first body portion and the second body portion also chemically dissolves or melts the fastener.

14. The method of claim 12, including: chemically dissolving or melting the fastener separately from chemically dissolving or melting the first body portion and the second body portion.

15. The method of claim 14, wherein chemically dissolving or melting the fastener also cures the coating.

16. The method of claim 11, wherein providing a multi-part pattern includes:
    forming the fastener by an additive layer manufacturing process.

17. The method of claim 11, wherein joining the first body portion and the second body portion using the fastener includes:
    applying a liquid adhesive to a surface of the first body portion arranged to engage the fastener and/or the second body portion;
    engaging the first body portion and the second body portion; and
    removing excess adhesive from an exterior surface of the assembled pattern.

18. The method of claim 11, wherein the method is a method of single crystal casting of a nozzle guide vane or blade for a gas turbine engine.

19. An investment casting pattern including:
    a consumable body formed of: a first body portion; and a second body portion; and
    a fastener arranged to form an interface between the first body portion and the second body portion, and to locate the first body portion relative to the second body portion,
        wherein the fastener comprises a chassis formed separately from the first body portion and the second body portion, wherein the chassis is arranged to engage the first body portion and the second body portion, and wherein the chassis includes a first recess arranged to receive an end region of the first body portion.

* * * * *